US005119108A

United States Patent [19]

Hatakeyama

[11] Patent Number: 5,119,108

[45] Date of Patent: Jun. 2, 1992

[54] METHOD AND APPARATUS FOR THERMAL RECORDING WITH OVERLAPPED THERMAL PRINT HEADS

[75] Inventor: Kouichi Hatakeyama, Tokyo, Japan

[73] Assignee: Mutoh Industries Ltd., Tokyo, Japan

[21] Appl. No.: 675,678

[22] Filed: Mar. 27, 1991

[30] Foreign Application Priority Data

Mar. 29, 1990 [JP] Japan .................................. 2-82858

[51] Int. Cl.[5] ............................ G01D 9/00; B41J 2/32

[52] U.S. Cl. ................................ 346/1.1; 346/76 PH; 400/120

[58] Field of Search ........................... 346/76 PH, 1.1; 400/120

[56] References Cited

U.S. PATENT DOCUMENTS

| | | | |
|---|---|---|---|
| 4,524,372 | 6/1985 | De Cock et al. | 346/160 |
| 4,660,052 | 4/1987 | Kaiya et al. | 346/76 PH |
| 4,977,410 | 12/1990 | Onuki et al. | 346/76 PH |
| 5,003,323 | 3/1991 | Onuki et al. | 346/76 PH |

*Primary Examiner*—Benjamin R. Fuller
*Assistant Examiner*—Huan Tran
*Attorney, Agent, or Firm*—Oblon, Spivak, McClelland, Maier & Neustadt

[57] ABSTRACT

According to a method for thermal recording of the present invention, image data is recorded within a wide range by combining recording regions of a plurality of thermal heads which are arranged in a line direction. The image data is recorded so that a recording region corresponding to one or more dots is formed as an overlap region between the thermal heads.

9 Claims, 7 Drawing Sheets

METHOD AND APPARATUS FOR THERMAL RECORDING WITH OVERLAPPED THERMAL PRINT HEADS

BACKGROUND OF THE INVENTION

1. Field of the Invention

The present invention relates to a thermal recording technique such as a thermal paper recording technique and a thermal transfer recording technique and, more particularly, to a method and an apparatus for thermal recording suitable for recording (e.g., printing and plotting) image data on a large-sized recording sheet.

2. Discussion of the Background

An automatic plotter is required to draw figures on a large-sized recording sheet such as A0- and A1-sized sheets. Conventionally, a thermal recording apparatus using an in-line type thermal head as well as a so-called pen plotter has been used in such an automatic plotter or a similar apparatus. The thermal recording apparatus using the in-line type thermal head has the advantage of high-speed operation, low noise, easy maintenance and the like. It is desirable that a long-sized thermal head adaptable for the A0- and A1-sized sheets is used in the thermal recording apparatus. Since, however, the long-sized thermal head is low in yield, high in manufacturing cost, and difficult in maintenance, it cannot be put to practical use. In a thermal recording apparatus for thermally recording image data on a large-sized recording sheet, therefore, a plurality of popular thermal heads such as thermal heads for A3-sized sheets are arranged along a line, i.e., in a line direction to perform a recording operation on large-sized sheets such as A0- and A1-sized sheets.

For example, as shown in FIG. 1, in a thermal recording apparatus capable of recording image data on a A0-sized recording sheet, three thermal heads 1-3 are arranged in parallel and in a staggered fashion, and thermal head 2 between thermal heads 1 and 3 is arranged ahead of thermal heads 1 and 3 in a direction in which recording sheets are fed. These three thermal heads are in-line type thermal heads adaptable for A3-sized recording sheets each having a resistance heating element array in which a number of resistance heating elements are arranged in line. Thermal heads 1-3 are so arranged that their effective recording regions are in contact with each other in the line direction, i.e., in the axial direction of the thermal heads. Thermal heads 1-3 are provided with platen rollers 4-6, respectively. Recording sheet 7 is inserted and pressed between thermal heads 1-3 and platen rollers 4-6. While recording sheet 7 is moving in the direction of arrow F shown in FIG. 1, the resistance heating elements of thermal heads 1-3 are selectively turned on, thereby recording image data on sheet 7. The image data is recorded on regions A, B and C of recording sheet 7, which are arranged in the line direction, by thermal heads 1, 2 and 3, respectively.

However, in the conventional thermal recording apparatus described above, if a gap occurs between the recording regions corresponding to thermal heads 1 to 3 shown in FIG. 1, the gap appears to be a blur on a recording sheet, even though it is a slight one. Therefore, the recording quality is remarkably lowered. It is thus necessary to precisely position the contact portions of the thermal heads, those contact portions corresponding to border portions of regions A, B and C; accordingly, the positioning operation is very complicated in manufacturing the thermal recording apparatus.

SUMMARY OF THE INVENTION

It is accordingly an object of the present invention to provide a method and an apparatus for thermally recording image data by a combination of a plurality of in-line type thermal heads arranged in a line direction, in which the continuity of recording between recording regions corresponding to the thermal heads is ensured and the adjustment of the thermal heads is simplified, resulting in an improvement in recording quality.

According to one aspect of the present invention, there is provided a method for thermally recording image data within a wide range by combining a plurality of in-line type thermal heads so that their recording regions are arranged in a line direction, wherein the image data is recorded so as to form an overlap recording region corresponding to one or more dots between the thermal heads in the line direction.

According to another aspect of the present invention, there is provide a thermal recording apparatus comprising: a plurality of in-line type thermal heads which are arranged in a line direction so that an effective recording region corresponding to one or more dots is formed as an overlap region; a sheet feed system for moving a recording sheet relatively to the plurality of in-line type thermal heads; and a recording data supply device operated in association with the sheet feed system, for supplying image data to the plurality of in-line type thermal heads so that the image data is recorded on the recording sheet with the overlap region corresponding to the one or more dots.

According to the present invention, since an overlap region corresponding to one or more dots is formed between the recording regions of adjacent thermal heads in the line direction, no gaps occur in the line direction or non-recording regions occur in a direction perpendicular to the line direction. Even though the relative positions of the thermal heads are shifted, the positions of the overlapped dots are slightly shifted, so that the shift is inconspicuous in resultant recording as far as the eye can see.

Consequently, in the present invention, the thermal heads can be easily positioned and a drawing of good quality can be obtained.

DETAILED DESCRIPTION OF THE PREFERRED EMBODIMENTS

Embodiments of the present invention will be described with reference to the accompanying drawings.

Figure 2:
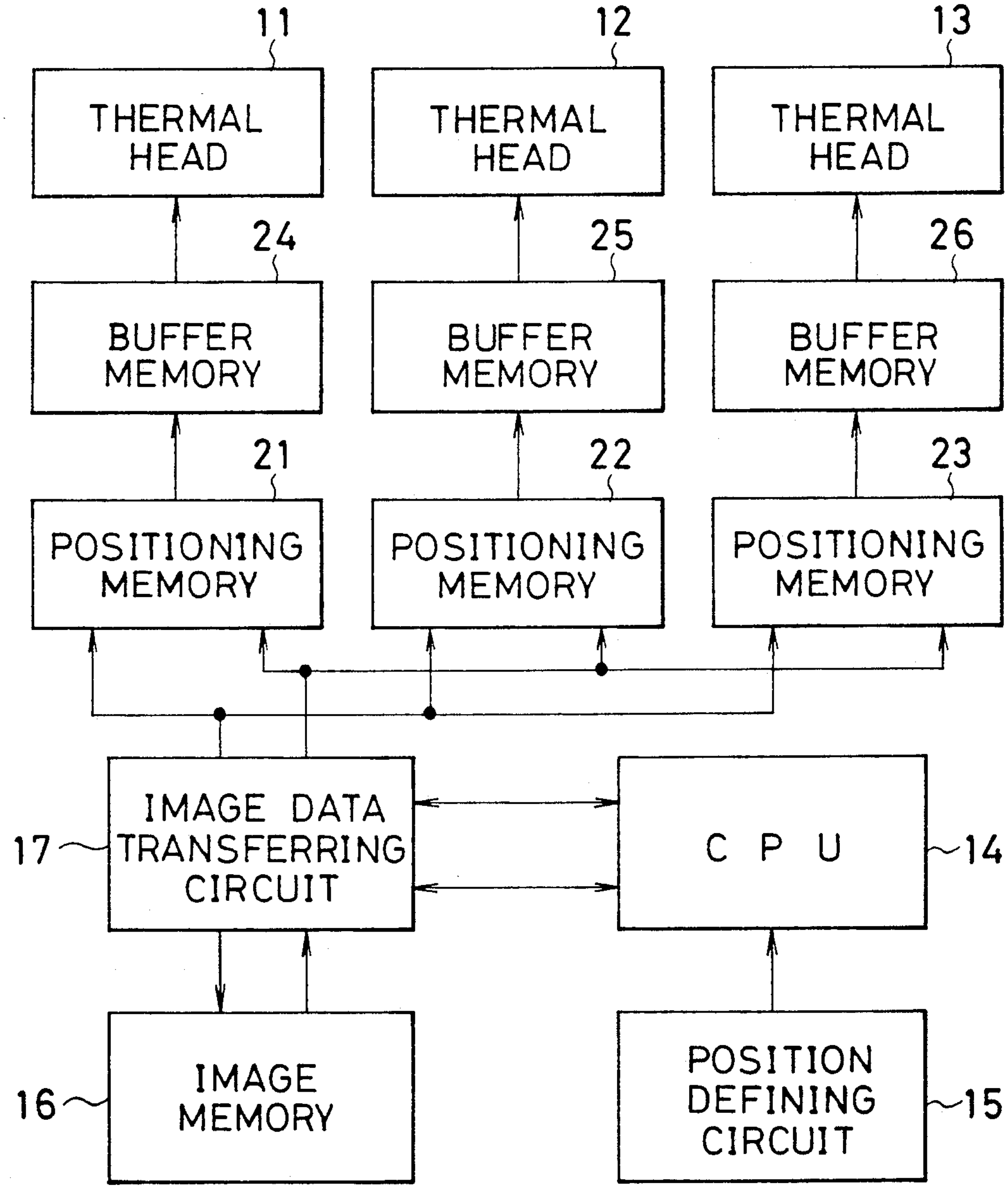
FIG. 2 is a block diagram showing a system of the main part of a thermal recording apparatus according to the first embodiment of the present invention.

FIG. 2 schematically shows a thermal recording apparatus according to the first embodiment of the present invention.

Figure 1:
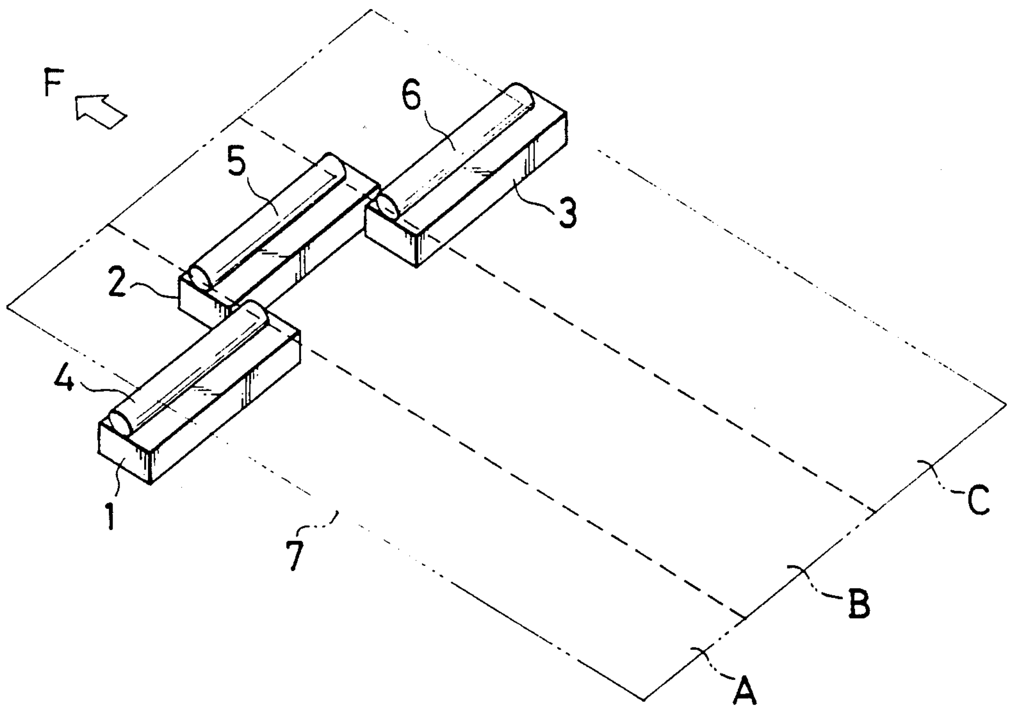
FIG. 1 is a perspective view schematically showing part of a conventional thermal recording apparatus.
Figure 3:
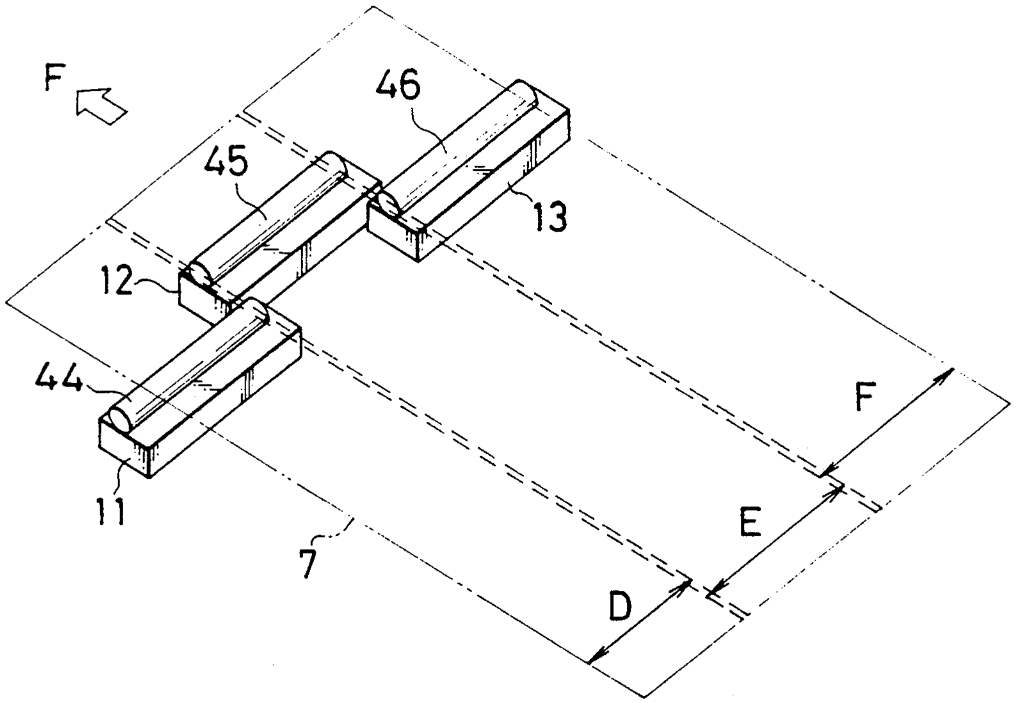
FIG. 3 is a perspective view schematically showing part of the thermal recording apparatus shown in FIG. 2.

The thermal recording apparatus includes in-line type thermal heads 11 to 13 capable of recording image data on an A3-sized sheet. For example, the image data can be recorded on an A0-sized sheet at its maximum using thermal heads 11 to 13. Thermal heads 11 to 13 and platen rollers 44 to 46 shown in FIG. 3 are basically arranged in the same manner as thermal heads 1 to 3 and platen rollers 4 to 6 shown in FIG. 1. However, thermal heads 11 to 13 differ from thermal heads 1 to 3 in that recording regions D to F of thermal heads 11 to 13 are arranged so as to overlap each other in the line direction, i.e., in the longitudinal direction of the thermal heads, which will be described later.

Central processing unit (CPU) 14 controls the entire thermal recording apparatus. Position defining circuit is connected to CPU 14 and has, for example, an erasable programmable read only memory (EPROM) in which information for specifying recording positions of thermal heads 11 to 13 is stored.

Image memory 16 is used to store image data recorded on an A0-sized sheet and connected to image data transferring circuit 17. Image data transferring circuit 17 transfers image data stored in image memory 16 to the designated positions of three positioning memories 21 to 23 in response to a command transferred from CPU 14 and in accordance with the position of the image data on a drawing plane. For example, a display controller (&LPD72120) of NEC Corporation can be used as image data transferring circuit 17.

Positioning memories 21 to 23 are arranged so as to correspond to thermal heads 11 to 13, respectively, and the addresses of the positioning memories correspond to the dot positions of the thermal heads. Image data is sequentially read out from positioning memories 21 to 23 and transmitted, as recording information, to thermal heads 11 to 13 through buffer memories 24 to 26.

Figure 4:
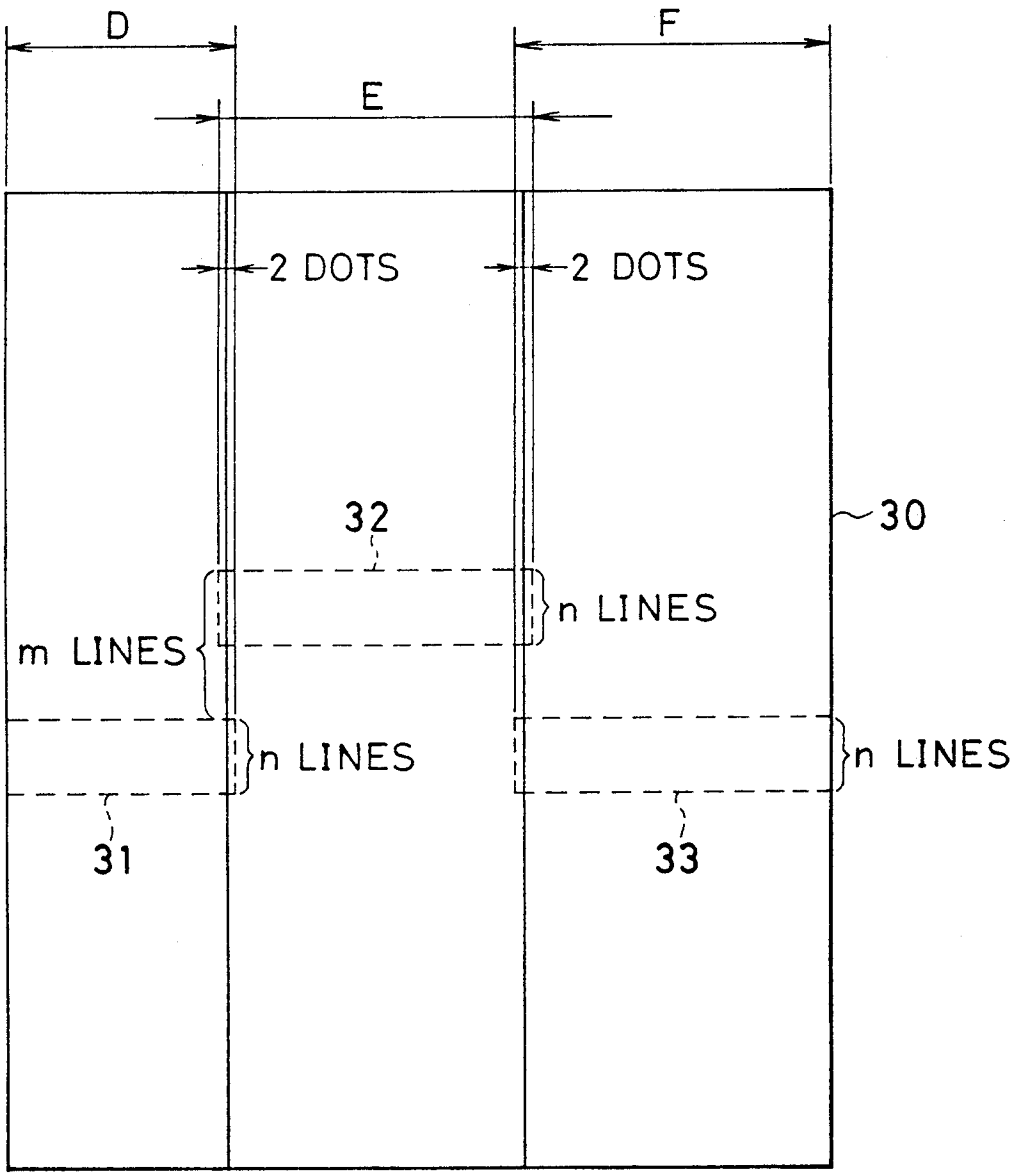
FIG. 4 is a schematic view showing the relationship between the contents stored in an image memory and the recording regions of thermal heads of the thermal recording apparatus shown in FIG. 2.

FIG. 4 shows the relationship between drawing plane 30 represented by image data stored in image memory 16 and the recording regions of thermal heads 11 to 13.

In FIG. 4, regions D to F show the ranges within which image data can be recorded by thermal heads 11 to 13, respectively. When the image data is recorded, an overlap recording region corresponding to two dots is formed between thermal heads 11 and 12 and between heads 12 and 13. For this reason, image data transferring circuit 17 transfers image data of transfer regions 31 to 33 of the n lines indicated by the broken line, including the overlap recording regions, to positioning memories 21 to 23. Transfer regions 31 and 33, which correspond to thermal heads 11 and 13, respectively, are shifted by m lines from transfer region 32 which corresponds to thermal head 12.

Figure 5C:
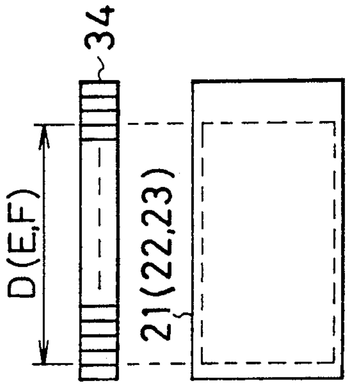
FIGS. 5A to 5C are schematic views showing the relationship between a positioning memory and a resistance heating element array of the thermal heads of the thermal recording apparatus shown in FIG. 2.
Figure 5B:
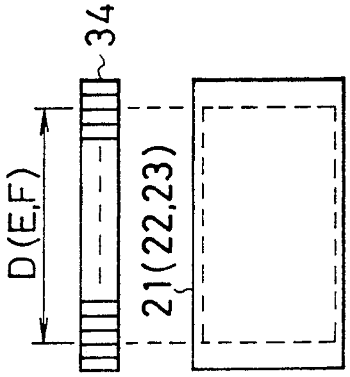
Figure 5A:
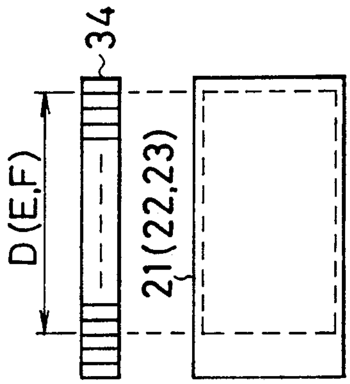

FIGS. 5A to 5C show the relationship between positioning memories 21 to 23 and resistance heating element array 34 of thermal heads 11 to 13. The size (the number of dots) of each of positioning memories 21 to 23 in the line direction is set to be much larger than each of recording regions D to F of thermal heads 11 to 13. As illustrated in FIGS. 5A to 5C, if the data storing positions of positioning memories 21 to 23 in the line direction are changed, the recording positions of thermal heads 11 to 13 are moved by units of dot in the line direction in accordance with the change of the data storing positions.

An operation of the thermal recording apparatus according to the first embodiment of the present invention will now be described. Thermal heads 11 and 13 are so constructed that they perform a recording operation ahead of thermal head 12.

When a recording operation is started, CPU 14 drives a paper feeding system including platen rollers 44 to 46 and supplies a transfer source address for specifying image data to be transferred from image memory 16, a transfer region and a transfer destination address of positioning memories 21 to 23, together with a transfer command, to image data transferring circuit 17 in association with the paper feeding system, thereby starting a transfer operation. At the beginning of the transfer operation, the initial addresses of recording regions D and F are suplied to image data transferring circuit 17 as transfer source addresses of positioning memories 21 to 23, and an address, which is obtained by subtracting addresses corresponding to the m lines from the initial address of recording region E, is supplied as a transfer source address of positioning memory 22 to image data transferring circuit 17. The region corresponding to the n lines is supplied, as a transfer region, to image data transferring circuit 17. The initial addresses of positioning memories 21 to 23 set in position defining circuit 15 are supplied to image data transferring circuit 17 as transfer destination addresses.

Upon receiving the transfer command, image data transferring circuit 17 transfers image data in a specified transfer region of image memory 16 to a specified transfer position of positioning memories 21 to 23. While data corresponding to the n lines is transferred from the initial positions of recording regions D and F to positioning memories 21 and 23, null data is transferred to positioning memory 22 since the transfer source address of positioning memory 22 is out of drawing plane 30. The reason why the image data corresponding to the n lines is transferred in block is that the number of transfer commands output from CPU 14 is decreased to reduce the burden of CPU 14.

The image data transferred to positioning memories 21 to 23 is transferred to buffer memories 24 to 26 line by line and then supplied to thermal heads 11 to 13, respectively. Thus recording is performed by means of thermal heads 11 to 13. Whenever data corresponding to the n lines is recorded, the transfer of the data from image memory 16 to positioning memories 21 to 23 is repeated to perform a recording operation by the use of thermal heads 11 to 13. The transfer of significant data to positioning memory 22 is started with a shift of the m lines from positioning memories 21 and 23, and completed with the displacement of the m lines from positioning memories 21 and 23. The recording of the significant data stored in positioning memory 22 using thermal head 12 is therefore completed with a shift of the m lines from positioning memories 21 and 23.

Figure 6B:
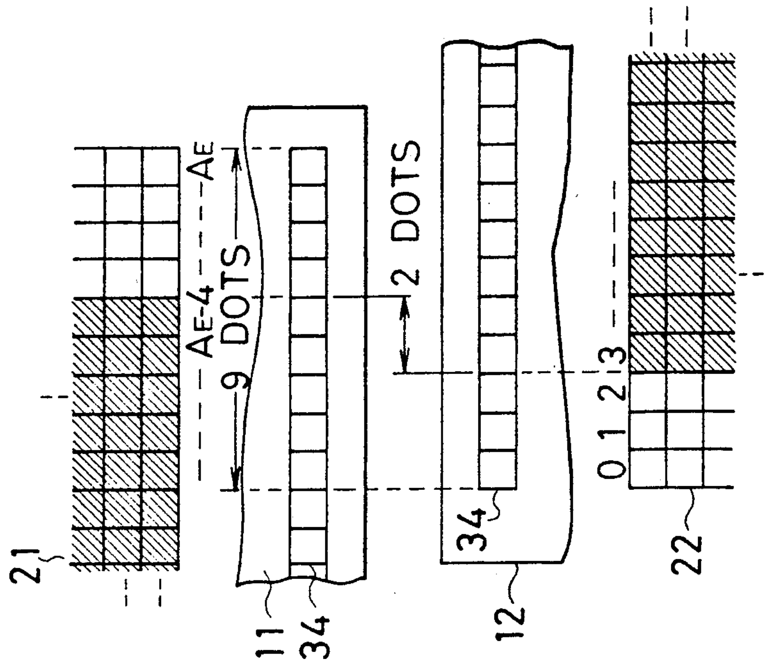
FIGS. 6A and 6B are schematic views showing the relationship between each of the thermal heads and the positioning memory in the contact portions between the thermal heads of the thermal recording apparatus shown in FIG. 2.
Figure 6A:
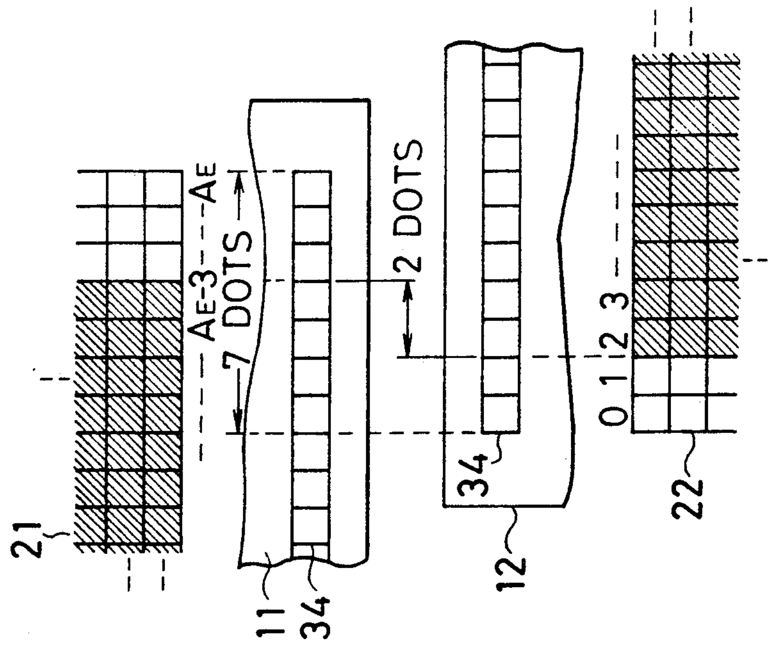

FIGS. 6A and 6B show in detail the contact portion between thermal heads 11 and 12. Thermal heads 11 and 12 are roughly positioned by a position adjusting mechanism (not shown) so that their resistance heating element arrays 34 overlap each other by 5 to 10 dots in the line direction. If, as shown in FIG. 6A, the number of dots overlapping between thermal heads 11 and 12 is seven and the last address of positioning memory 21 in the line direction is "$A_E$-3", the initial address of positioning memory 22 in the line direction is set to "2". Similarly, as shown in FIG. 6B, if the number of dots overlapping between thermal heads 11 and 12 is nine and the last address of positioning memory 21 in the line direction is "$A_E$-4", the initial address of positioning memory 22 in the line direction is set to "3". Thus image data is stored in the areas hatched in FIGS. 6A and 6B and recorded by thermal heads 11 and 12 with an overlap region corresponding to two dots.

The initial addresses of positioning memories 21 and 22 in the line direction can be determined while recording a grid-like test pattern or the like in the initial adjustment process of manufacturing the thermal recording apparatus. If, for example, dot forming data is previously stored in the overlap recording region corresponding to the two dots, it can be determined whether the initial addresses are appropriate, by confirming by eye the width of lines resulting from the recording.

In the thermal recording apparatus according to the first embodiment of the present invention, the maximum shift in relative position between thermal heads 11 and 12 or between thermal heads 12 and 13 is half of a dot pitch. If, however, the shift corresponds to a gap in which no dots are formed, it appears to be a blur in the vertical direction and is very conspicuous. If the shift corresponds to a gap in which dots are formed, it cannot be discriminated by eye. According to the first embodiment, since the overlap recording region corresponding to the two dots, no gaps occur between the thermal heads. A drawing of high quality can thus be obtained. Further, the thermal heads are arranged so that the number of overlapped dots is larger than that of overlap-recorded dots, and the number of dots suitable for the overlap recording is determined by defining a range of the dots to be used. Therefore, the thermal heads can be easily positioned.

The overlap recording region corresponding to two dots is formed in the first embodiment described above. However, the number of overlap-recorded dots is not limited to two but may be one or a few. If the overlap-recorded dots are further increased in number, i.e., if an overlap recording region corresponding to several tens of dots is formed, the thermal heads can be more easily positioned. If, however, the number of overlap-recorded dots is too large, the shift of the dots is conspicuous. It is usually desirable that the number of the overlap-recorded dots is 2 to 4.

If, as in the first embodiment, the number of overlapped dots is set to be larger than that of overlap-recorded dots and a desired number of overlap-recorded dots is obtained by adjusting the number of dots to be used, the thermal heads can be more easily positioned. If the number of the overlapped dots is remarkably larger than that of the overlap-recorded dots, the positioning of the thermal heads is very simplified, but the dots which are not used is increased in number as a result of the adjustment of the overlap-recorded dots, and thus the efficiency of use of the thermal heads is reduced. It is therefore desirable that the number of overlapped dots is set to be larger by 2 to 4 than that of overlap-recorded dots when the thermal heads are arranged.

Figure 7:
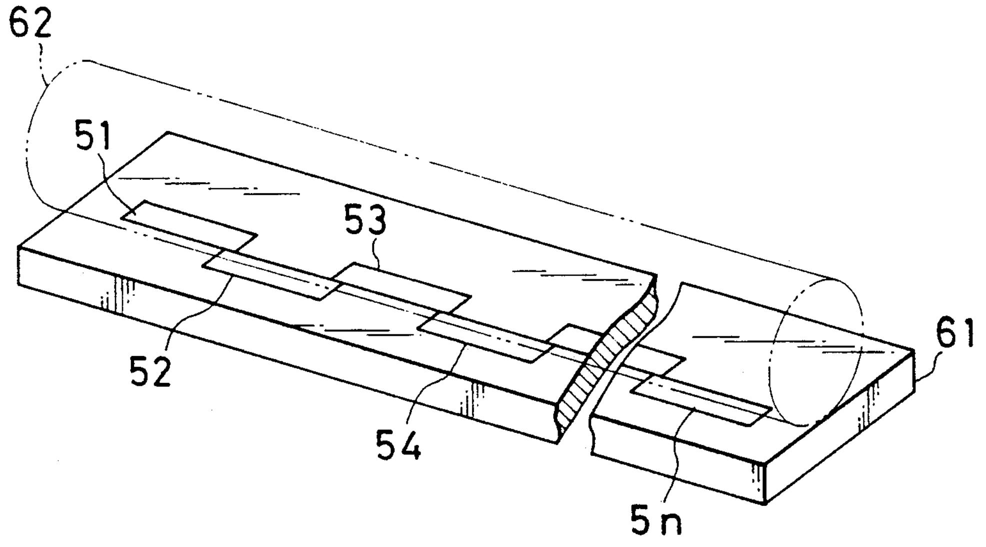
FIG. 7 is a perspective view schematically showing part of a thermal recording apparatus according to the second embodiment of the present invention.

FIG. 7 schematically shows a recording head of a thermal recording apparatus according to the second embodiment of the present invention.

In the first embodiment, platen rollers 44 to 46 are arranged so as to correspond to thermal heads 11 to 13, as in the prior art apparatus. In the second embodiment, a plurality of thermal head modules 51 to 5n are arranged on common base 61 in parallel and in a staggered fashion.

Thermal head modules 51 to 5n each include an in-line type resistance heating element array in which a number of resistance heating elements are arranged in line. Odd-numbered thermal head modules 51, 53, . . . are arranged in a line and even-numbered thermal head modules 52, 54, . . . are arranged in another line. The lines of the odd- and even-numbered thermal head modules are close to each other in a paper feed direction. The odd- and even-numbered thermal head modules have overlapped recording regions therebetween, as in the case of thermal heads 31 to 33 of the first embodiment. In the second embodiment, a single platen roller 62 is provided halfway between the lines of the odd- and even-numbered thermal head modules on base 61. Platen roller 62 presses a recording sheet against base 61 and is elastically deformed. The recording sheet is thus brought into close contact with both the lines of the odd- and even-numbered thermal head modules. Of course, it is desirable that no gaps occur between the resistance heating element arrays of the odd-numbered thermal head modules and those of the even-numbered thermal head modules. Even though a slight gap occurs, the elastic deformation of platen roller 62 enables the recording sheet to be effectively brought into close contact with the resistance heating element arrays of the even- and odd-numbered thermal head modules.

In the second embodiment, since the odd- and even-numbered thermal head modules have overlapped recording regions, the thermal head modules 51 to 5n can be easily positioned with respect to base 61.

According to the present invention, it is needless to say that the present invention can be applied to not only a thermal paper recording apparatus using thermal paper but also a thermal transfer recording apparatus using thermal fusion ink, thermal sublimation ink or the like.

What is claimed is:

1. A method for thermally recording image data within a wide range by combining a plurality of in-line type thermal heads which are shifted from each other in a line direction, wherein the image data is recorded so as to form an overlap recording region corresponding to one or more dots between the thermal heads in the line direction, and wherein said plurality of thermal heads are arranged so that an overlap recordable region is larger than a predetermined overlap recording region, and part of said overlap recordable region is nullified, thereby to form said predetermined overlap recording region.

2. The method according to claim 1, wherein said plurality of thermal heads are arranged in a staggered fashion.

3. The method according to claim 1, wherein said plurality of thermal heads are in-line type thermal head modules arranged on a single base.

4. The method according to claim 1, wherein said predetermined overlap recording region corresponds to 2 to 4 dots.

5. A thermal recording apparatus comprising:

a plurality of in-line type thermal heads which are shifted from each other in a line direction and arranged so that an effective recording region corresponding to one or more dots is formed as an overlap region, wherein said plurality of in-line type thermal heads are arranged so that an overlap recordable region is larger than a predetermined overlap recording region, and said recording data supply means forms the predetermined overlap recording region without supplying recording data corresponding to part of the overlap region;

sheet feed means for moving a recording sheet relatively to said plurality of in-line type thermal heads; and recording data supply means operated in association with said sheet feed means, for supplying image data to said plurality of in-line type thermal heads so that the image data is recorded on the recording sheet with the overlap region corresponding to said one or more dots.

6. The apparatus according to claim 5, wherein said plurality of in-line type thermal heads are arranged in a staggered fashion along a line direction.

7. The apparatus according to claim 5, wherein said plurality of in-line type thermal heads are in-line type thermal head modules arranged on a single base.

8. A thermal recording apparatus comprising:

a plurality of in-line type thermal heads which are shifted from each other in a line direction and arranged so that an overlap recordable region corresponding to a plurality of dots is formed at a boundary between said thermal heads as an overlap recordable region, wherein said plurality of in-line type thermal heads are arranged so that said overlap recordable region is larger than a predetermined overlap recording region, and said recording data supply means forms the predetermined overlap recording region without supplying recording data corresponding to part of the overlap recordable region;

sheet feed means for moving a recording sheet relatively to said plurality of in-line type thermal heads; and recording data supply means operated in association with said sheet feed means, for supplying image data to a selected one of said plurality of in-line type thermal heads so that the image data is recorded on a recording sheet at the overlap recording region.

9. The apparatus according to claim 8, wherein said recording data supply means comprises:

image data storing means for storing image data to be recorded;

positioning memory means for temporarily storing image data to be transferred to said thermal heads arranged so as to correspond to the recordable region;

image data transfer means for transferring image data selected in accordance with a predetermined overlap recording format from said image data storing means to a selected one of said positioning memory means, thereby performing a predetermined overlap recording; and image data supply means for supplying the image data stored in said positioning memory means to said thermal heads.

* * * * *